United States Patent [19]
Bosc et al.

[11] 3,916,407
[45] Oct. 28, 1975

[54] DOPPLER NAVIGATION SYSTEM WITH ANGLE AND RADIAL VELOCITY DETERMINATION

[75] Inventors: Henri J. Bosc; Jean-Marie H. Colin, both of Paris, France

[73] Assignee: International Standard Electric Corporation, New York, N.Y.

[22] Filed: June 24, 1974

[21] Appl. No.: 482,376

[30] Foreign Application Priority Data
June 26, 1973 France .................. 73.23274

[52] U.S. Cl. .......... 343/9; 343/108 M; 343/113 DE
[51] Int. Cl.² ........................................... G01S 9/44
[58] Field of Search ............. 343/108 SM, 9, 8, 7.7, 343/113 DE, 5 DP, 5 LS, 5 W

[56] References Cited
UNITED STATES PATENTS

| | | | |
|---|---|---|---|
| 2,977,592 | 3/1961 | Brock | 343/108 M |
| 3,141,166 | 7/1964 | Strong et al. | 343/108 M |
| 3,611,377 | 10/1971 | Rittenbach | 343/9 |
| 3,670,338 | 6/1972 | Earp | 343/108 M |
| 3,728,729 | 4/1973 | Overbury | 343/108 M |
| 3,781,878 | 12/1973 | Kirkpatrick | 343/5 W |
| 3,852,744 | 12/1974 | Slater | 343/9 |

OTHER PUBLICATIONS
M. I. Skolnik, *Radar Handbook*, McGraw-Hill, 1970, pp. 22-2 & 22-3.

*Primary Examiner*—Maynard R. Wilbur
*Assistant Examiner*—G. E. Montone
*Attorney, Agent, or Firm*—William T. O'Neil

[57] ABSTRACT

A surveillance radar based on the simulated Doppler (commutated array) concept. Antennas are only moderately directive and the commutation is analogous to scanning. Alternate array commutation cycles are in opposite directions. Position information is derived by echo signal processing to determine angles as a function of phase relationships. Target true Doppler (velocity) values are determined by subtracting echo Doppler components corresponding to first and second array commutation directions.

10 Claims, 9 Drawing Figures

DOPPLER NAVIGATION SYSTEM WITH ANGLE AND RADIAL VELOCITY DETERMINATION

BACKGROUND OF THE INVENTION

1. Field of the Invention

The present invention relates to a high angular accuracy Doppler radar for continuous surveillance of a given region in space.

2. Description of the Prior Art

Radars used at present generally transmit a relatively narrow beam, the direction of which changes as a function of time, so as to scan a given solid angle. One disadvantage of that arrangement, among others, is that a given direction in space is only examined at discrete moments and angular accuracy is limited by the angular width of the beam.

In order to remedy the first of these drawbacks, it has been proposed to use several receivers assigned to different directions in space, for example in the case of simultaneous beam elevation measurement, but this does not enable high angular accuracy to be obtained.

One of the possible undesirable consequences of inadequate angular accuracy is the difficulty of avoiding position fixing errors owing to parasitic reflections, particularly on land or sea, whereby a false image of the real target is caused. This may be, in particular, the case when targets traveling at low altitude are being tracked.

Commutated antenna arrays and systems are known, per se, and have been used in simulated Doppler aircraft approach and landing beacon equipment. Such systems are designed for air derivation of angular position information in at least one of the azimuth and elevation coordinates. An example of such a prior art system is described in U.S. Patent No. 3,626,419.

SUMMARY OF THE INVENTION

The invention employs a commutated antenna array as an element of the novel combination, but for a purpose and in a system differing from the prior art uses of such arrays.

The general objective of the present invention is to provide a radar for continuous surveillance of a relatively large region in space with a high degree of angular accuracy.

According to the invention, there is provided a radar for continuous surveillance of a region in space characterized in that it comprises an antenna having at least N aligned radiators (a linear array), switching means (commutator) for sequentially employing said radiators, for at least one of the transmitting and receiving operations, a coherent receiver known per se, to which the signal received is applied and which supplies a Doppler frequency signal, circuits for determining the two values of the Doppler frequency, for each target, respectively, during the scanning of said array in one direction and in the other through said switching means, and circuits for computing the velocity of the target and its angular position on the basis of these two Doppler frequency values.

BRIEF DESCRIPTION OF THE DRAWINGS

The invention will be more fully understood and other features will appear from the following description and the attached drawings wherein.

DESCRIPTION OF THE PREFERRED EMBODIMENTS

Figure 1:
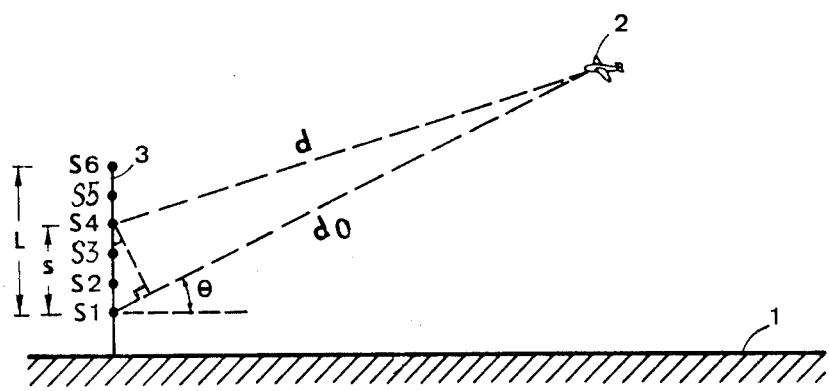
FIGS. 1 and 2 are explanatory diagrams, showing the principle of the radar according to the invention.

Referring now to FIG. 1, explanation of the principle of the radar according to the invention may be begun. This radar comprises an antenna array including N radiating elements, S1 to S6 (here N=6), which are employed successively in one antenna scanning direction, and then in the other, for example in the order S1 ... 6, and then S6 ... S1.

Taking the case of a pulse radar, as will be done in the following description, each radiating element is employed for one radar repetition period.

Each of the antenna elements S1 to S6 is an omnidirectional antenna, or at least one having a lobe covering the entire angular sector of interest. The same elements can, of course, be used for transmitting and receiving. Thus a first pulse, transmitted by S1, will be received by this same antenna element. The following pulse will be transmitted by S2 and reception will be carried out by this same element and so on. It is immediately seen that the assembly is equivalent to a single source, movable bi-directionally along the linear axis of the array.

Assume a target with an elevation angle $\theta$, taken as stationary for the time being. The movement due to the aforementioned commutation of the source results in a relative movement of the source and the target producing an apparent relative radial velocity which is the cause of an "artificial" Doppler frequency.

If $d_o$ is taken to represent the distance between target 2 and antenna element S1, and $\theta$ is the corresponding elevation angle (angle between the line perpendicular to the axis of the array and the actual target angle), the distance d between the target and a given element with an ordinate s with respect to S1 has the value $d = d_o - s \sin \theta$.

In passing from S1 to S6 in a time $t_o$, the apparent radial velocity of target 2 actually assumed to be stationary in space will be expressed by:

$$V = \frac{L \sin \theta}{t_o},$$

where L is the distance between S1 and S6. The resulting Doppler frequency for the scanning direction in question (S1 toward S6) is expressed by:

$$F_d = \frac{2V}{c} F_o = \frac{2L F_o \sin \theta}{c t_o} \qquad \text{Equation 1}$$

where $c$ represents the velocity of light and $F_o$ is the radar transmitting frequency. In the case of scanning in the opposite direction, from S6 toward S1, the Doppler frequency will clearly be $-F_d$.

It can be seen that this Doppler frequency is a function of the sine of the elevation angle and that measurement of this frequency provides the basis for computation of the value of $\theta$.

In the above, the effect of reflections from the ground 1 has not yet been considered.

Figure 2:
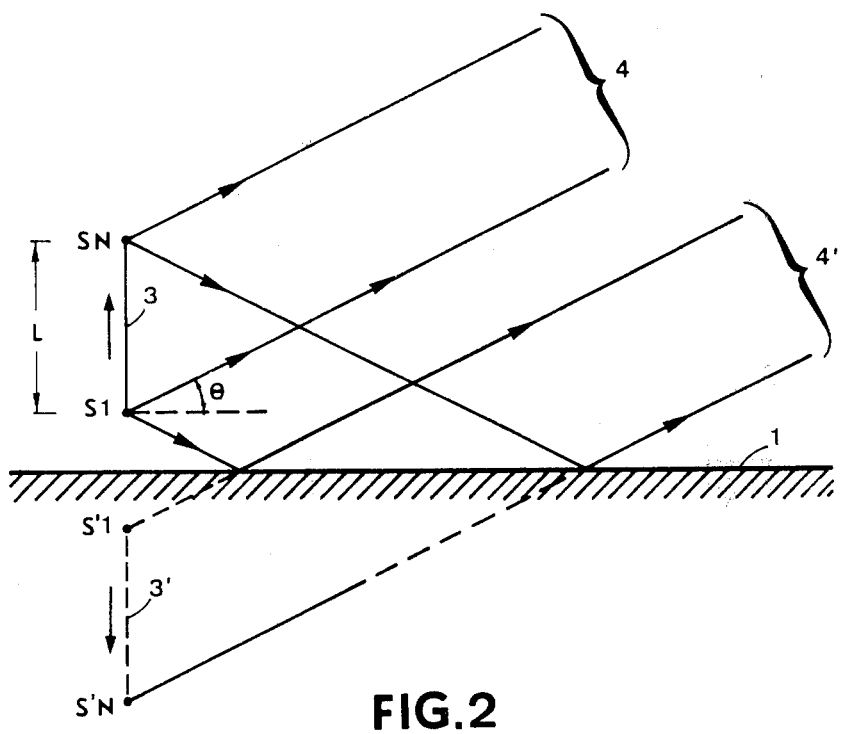

FIG. 2 depicts two beams scanning the target, namely, the direct beam 4 and the reflected beam 4' which seems to originate from an image antenna 3' of antenna 3 in relation to ground 1.

It can be seen that, while the difference in the path of the waves transmitted by S1 and SN is L sin $\theta$, it is equal to -L sin $\theta$ between the waves seeming to be transmitted by S'1 and S'N. Thus, when antenna 3 scans from S1 to SN, the Doppler frequency for the direct beam is given by relation (1) while simultaneously it is $-F_d$ for the reflected beam.

Figure 3:
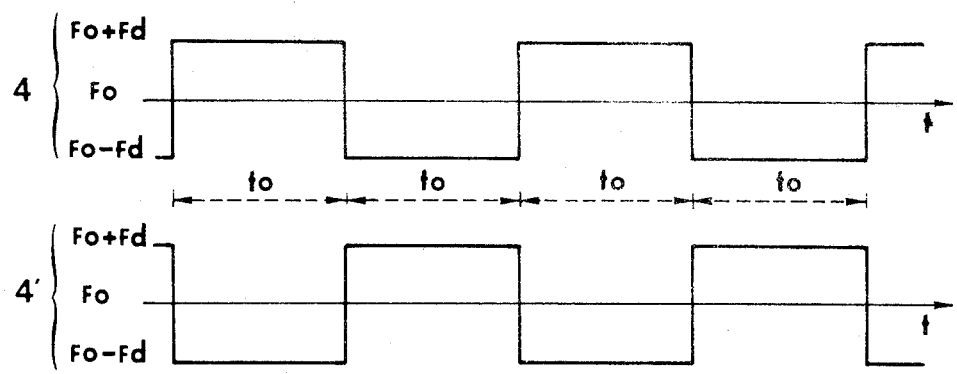
FIG. 3 is a received frequency envelope diagram.

FIG. 3 shows the envelope of frequency variations of the signal received as a function of the antenna scanning direction for direct beam 4 and reflected beam 4'. On this basis, it is thus possible to separate the signals received corresponding to the direct and the reflected beams. Taking now the case of a moving target 2 traveling in the direction depicted in FIG. 1, Doppler frequency $Fd_o$ due to the movement of the target itself is added to that caused by movement of the source. For the direct beam, the frequency of the signal received will thus be $F_o + Fd_o + F_d$ or $F_o + Fd_{do} - F_d$, according to the antenna scanning direction. The signs before $F_d$ will be inverted for the reflected beam. By committing to memory the frequency received during the previous antenna scanning period, it is possible to determine elevation $\theta$ of the target and the radial velocity of the target itself in a given scanning period. Indeed, by calling $F1 = F_o + Fd_o + F_d$, the frequency received during antenna scanning in a first direction (from S1 toward SN) and $F2 = F_o + Fd_o - F_d$ the frequency received during the next following scanning period in the opposite direction (from SN toward S1), the following is obtained by demodulation in relation to transmitted frequency $F_o$:

$$F'1 = Fd_o + F_d$$

and $$F'2 = Fd_o - Fd.$$

When these two resulting Doppler frequencies $F'1$ and $F'2$ are known, it is clearly easy to determine:

$$F_d = \tfrac{1}{2}(F'1 - F'2),$$

hence the elevation $\theta$ in accordance with Equation 1. Similarly, $$Fd_o = \tfrac{1}{2}(F'1 + F'2)$$

and hence the radial velocity $v_o$ of the target itself may be determined.

Although the general principle of the radar according to the invention has been described assuming that the individual antenna elements are used sequentially both for transmitting and receiving, it is also possible to switch (commutate) these elements only for transmitting, receiving being carried out with a single fixed element, or it is possible to commutate only during receiving, transmission being carried out by means of a single fixed antenna. In employing those variations, the fixed antenna can be either one of the predetermined antenna elements or an additional antenna. In all cases in which a single fixed antenna is used, either for transmission, or for receiving, the "artificial" Doppler frequency due to the scanning of the unit antennae is no longer expressed by Equation 1 but, as can easily be seen from calculation, by:

$$F_d = \pm \frac{L F_o \sin \theta}{c t_o}.$$

The sign applies according to the antenna scanning direction.

It is easy to determine frequency $F_d$ as a function of the radar repetition frequency Fr and the dimensions of antenna 3 expressed in transmission wavelengths. If $a\lambda$ represents the interval between two adjacent antenna elements, $\lambda$ being the transmission wavelength and a constant factor $a$, and if the case of a fixed transmitting antenna is considered, the phase shift $\delta\phi$ between the echoes received from the same target successively by two adjacent antenna elements used respectively during two successive repetition periods, is determined by:

$$\delta\phi = \frac{2\pi \, \delta d}{\lambda} = 2\pi \, a \sin \theta,$$

where $\delta d$ represents the path difference for the two elements in question.

It is then simple to calculate that, for a complete scanning period, in one antenna direction $$F_d = a F_r \sin \theta \qquad \text{Eq. 2}$$

Figure 4:
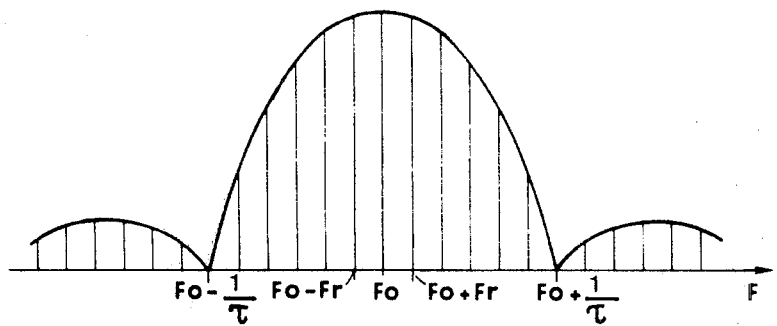
FIG. 4 represents the spectrum of the signals transmitted by the radar of the invention.

FIG. 4 represents the spectrum of the signal transmitted for rectangular transmitted pulses of duration $\tau$. The spectrum is centered on $F_o$ and shows a series of lines with frequencies $F_o + n F_r$.

Figure 5:
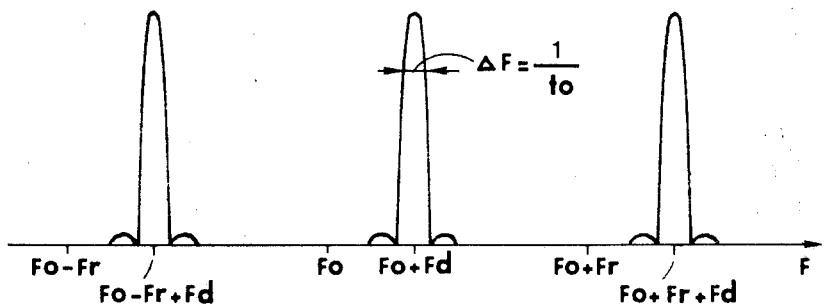
FIG. 5 represents an expanded portion of the spectrum of a signal received during an antenna scanning period.

FIG. 5 partially represents the spectrum of the signal received during array scanning in a given direction (here from S1 toward SN). The scale has been expanded and the target has been taken as stationary for simplicity. In the case of a moving target, the whole of the spectrum would simply translate by a value $Fd_o$. It can be seen that there is a series of spectrum lines of a width $\Delta F = (1/t_o)$ with frequencies $F_o + F_d + n F_r$ (with $n$ a positive, negative or zero integer).

When a Doppler frequency measurement is carried out at each scan period of duration $t_o$, the measurement is made with an accuracy of $\pm (\Delta F/2)$, and elevation angle accuracy is then, on the basis of Equation 2 defined as $$\Delta\theta = \pm \frac{1}{2N a \cos \theta}.$$

According to another feature of the invention, angular accuracy is improved by increasing the time devoted to angular measurement and by using the signal corresponding to several successive antenna scanning periods instead of merely using the signal received during a single scanning period. To do so, it is necessary to carry out spectrum analysis of the signal received during a time $pt_o$, where $p$ is a positive integer.

Figure 6:
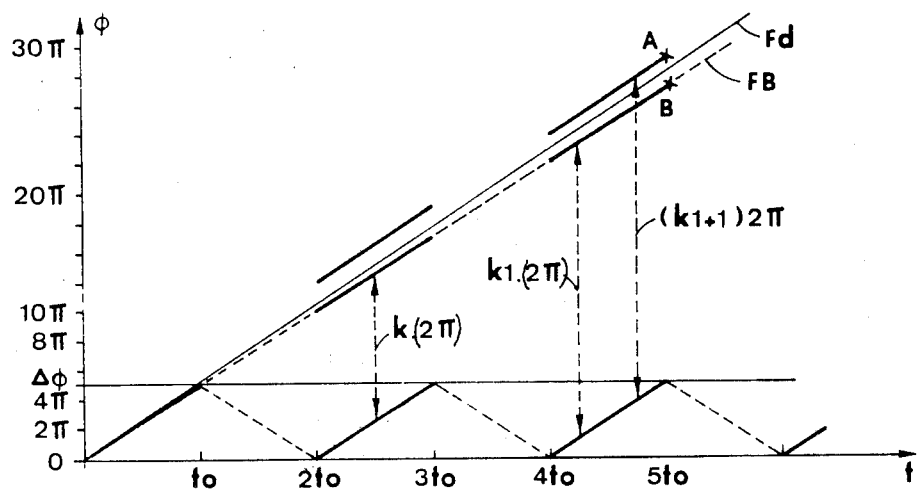
FIG. 6 depicts the phase shifts of a signal received during several successive antenna scanning periods.

FIG. 6 represents the variation, as a time function of the phase $\phi$, of the signal received. This phase passes from 0 to $\Delta\phi$. in a time $t_o$, corresponding to the antenna scanning time (commutator cycle) in one direction, then decreases from $\Delta\phi$ to 0 during the following scanning period in the opposite direction, and so on.

For the time being, scanning in one direction only will be considered (for example, direction S1 to SN, giving increasing phases) giving a first Doppler frequency value. The corresponding phase variations are represented in continuous lines.

The Doppler frequency $F_d$ of the signal received during time interval 0 to $t_o$ is equal to $(\Delta\phi/2\pi t_o)$.

This frequency $F_d$ corresponds to a phase variation for the signal received as a time function represented by the straight line designated $F_d$ in the figure. But the phase variation during a subsequent scanning operation in the same direction, shifted by a multiple of $2\pi$ with a suitable order $k$, will generally not give a phase variation as a time function coinciding with straight line $F_d$. Thus, FIG. 6 shows in unbroken lines the two segments representing the phase variation between $2t_o$ and $3t_o$ shifted respectively by $k(2\pi)$ and $(k+1)2\pi$. These two segments bracket straight line $F_d$ but neither of them coincides with it.

At the end of time $pt_o$ (here $p=5$), there will be a series of possible phase values $\Delta\phi + k(2\pi)$ (with $k$ a positive or zero integer) corresponding to as many possible frequencies. Frequency $F_d$ will be bracketed by the frequency values corresponding to the straight lines, such as FB, passing through points A and B which are obtained for particular values of $k$, $kl$ and $kl+1$. It can be seen that the line FB passing through B represents a phase variation corresponding to a frequency of the signal received $$FB = \frac{kl.2\pi + \Delta\phi}{2\pi \times pt_o} = \frac{kl}{pt_o} + \frac{1}{p}F_d$$

and similarly the line passing through A corresponds to a frequency $$FA = \frac{(kl+1)2\pi + \Delta\phi}{2\pi \times pt_o} = \frac{kl+1}{pt_o} + \frac{1}{p}F_d.$$

Figure 7:
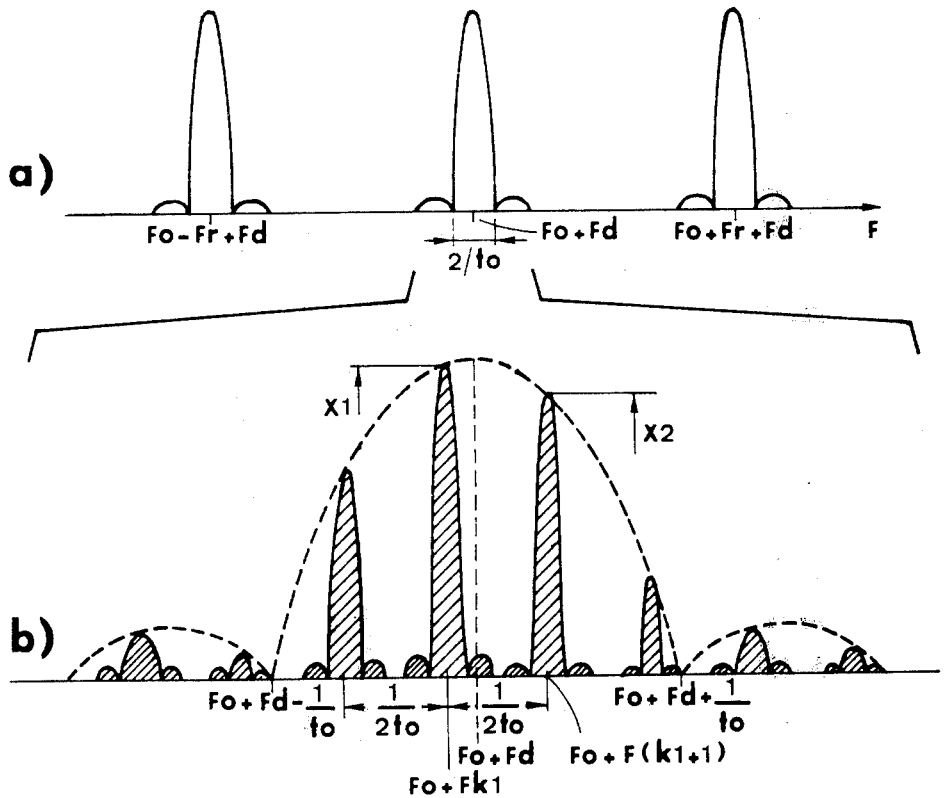
FIG. 7 ($a$ and $b$) represent the spectrum of a signal received during several successive antenna scanning periods, FIG. 7$b$ being an expanded representation.

The spectrum of the signal received during the increasing phase scanning periods during a time $pt_o$ is represented in FIG. 7. For simplicity, it has also been assumed that the target is stationary. The spectrum obtained around frequency $(F_o + F_d)$ is reproduced around frequencies $F_o + n F_r + F_d$ (as represented at FIG. 7a). The central portion of the spectrum between $F_o$ and $(F_o + F_r)$ (which can be isolated by filtering) is represented as expanded in FIG. 7b. The signal examined is constituted by pulses with duration to and repetition period $2t_o$, cut out of a signal at frequency $F_d$. The spectrum which is centered, as already mentioned, around frequency $(F_o + F_d)$, thus has an envelope of $(\sin x)/x$ form with a width $(2/t_o)$ between zeros, symmetrical about $(F_o + F_d)$, and is composed of spectrum lines spaced by $(1/2t_o)$ (repetition frequency of the signal analyzed). These lines are, as established above, located at frequencies $$F_o + F_k = F_o + \frac{k}{pt_o} + \frac{1}{p}F_d,$$

where $k$ is an integer.

As already indicated, there is not necessarily a value $F_k$ equal to $F_d$ and, generally, there is not therefore a line with frequency $F_o + F_d$. Thus, in order to determine $F_d$, it is necessary to use the frequencies bracketing frequency $F_d$, namely $Fk_l$ and $F(kl+1)$ which are the FB and FA frequencies computed earlier. It is clear that, if the shape of the spectrum envelope and amplitudes X1 and X2 of the two lines bracketing $F_d$ are known, it is easy to determine $F_d$ precisely by interpolating. Initially however, $F_d$ must be approximately determined in order to obtain the value of $kl$, subsequently the $kl$ and $(kl+1)$ order line amplitudes are determined for the signal of duration $pt_o$. Finally, interpolation is used to obtain $F_d$. An angular accuracy calculation identical to the one made above for the case of a signal with a duration $t_o$ shows that the following angular accuracy can be obtained:

$$\Delta\theta = \pm \frac{2}{pNa\cos\theta}$$

hence improved in the ratio $P/2$.

Figure 8:
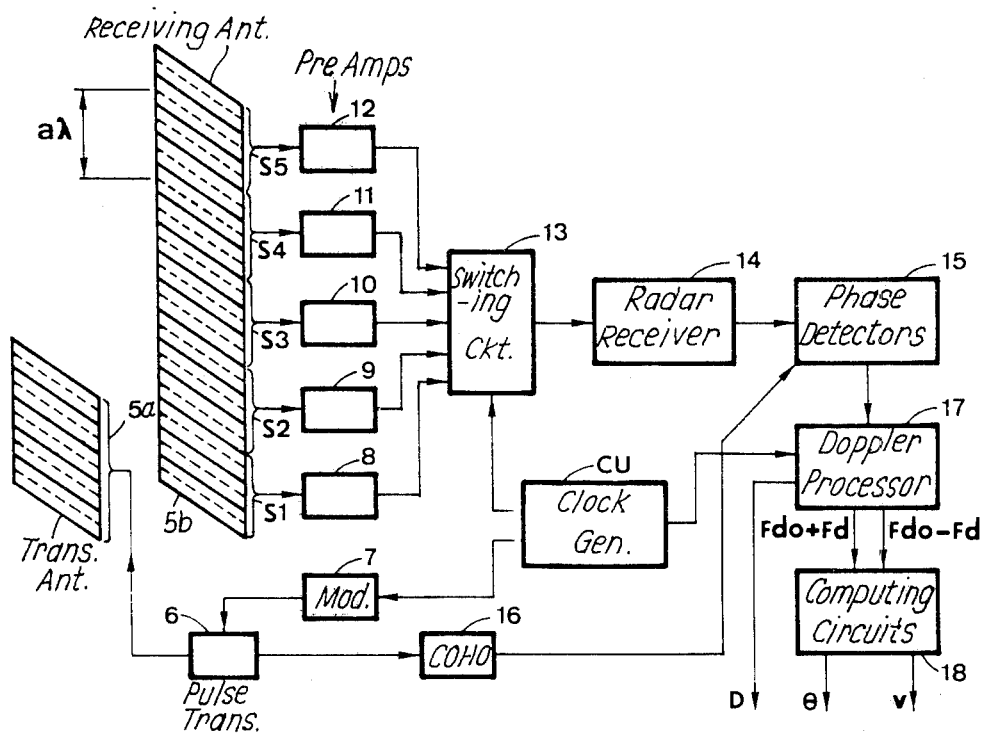
FIG. 8 is a schematic block diagram of a radar according to the invention.

FIG. 8 depicts in schematic block form a radar according to the invention applying the arrangements described above.

This radar comprises a single fixed transmitting antenna 5a, with slotted waveguides, fed by a pulse transmitter 6 modulated by a pulse modulator 7. The receiving antenna is a linear array 5b comprising elements S1 through S5, each constituted by slotted waveguides and whose phase centers are spaced at $a\lambda$ intervals. Each of 5a and 5b is designed for an orthogonal pattern lobe limited generally to the angular zone in which measurements are to be carried out. The radiating elements S1 through S5 each comprise a generally horizontal array of waveguide slot radiators and are therefore directive in the orthogonal plane (azimuth in this case). This has the advantage of enabling antenna gain to be optimized and angular ambiguities to be avoided. It is taken, for example, that the receiving antenna as illustrates, enables angular elevation measurements. Horizontal scanning can, for example, be obviously carried out by rotating the antenna system. Each receiving antenna element is followed by a pre-amplifier 8 to 12 for compensating the losses due to antenna switching by switching circuit 13. This circuit 13, operated by clock signals from CU, sequentially connects antenna elements S1 to S5 to a conventional radar receiver 14 supplying an intermediate frequency signal to a phase detector 15 operating in a known manner to provide coherent detection. For this purpose, phase detector 15 receives a reference signal supplied by a coherent oscillator (coho) 16 controlled by the phase of the signal transmitted, one part of which is applied to it by transmitter 6. The video signal at the Doppler frequency, supplied by phase detector 5, is applied to circuits (Doppler Processor) 17 for determining the two Doppler frequency values $Fd_o + F_d$ and $Fd_o - F_d$ respectively during each of the receiving antenna scanning directions. This is done for each target by analyzing the successive range bins, which enables the distance D, within the total range coverage analyzed, to be obtained at any time. The values $Fd_o + F_d$ or $Fd_o - F_d$ are applied to computing circuits 18 which commit to memory the frequency values of the opposite scanning direction to enable values $Fd_o$ and $F_d$ to be obtained respectively by adding and subtracting, in this way giving the velocity $v$ of the target as well as its elevation θ. Clock generator CU supplies the signals necessary to ensure the succession in time of the different operations to be carried out, in synchronism with the radar transmitter. This synchronizer function is, per se, well understood in this art.

Figure 9:
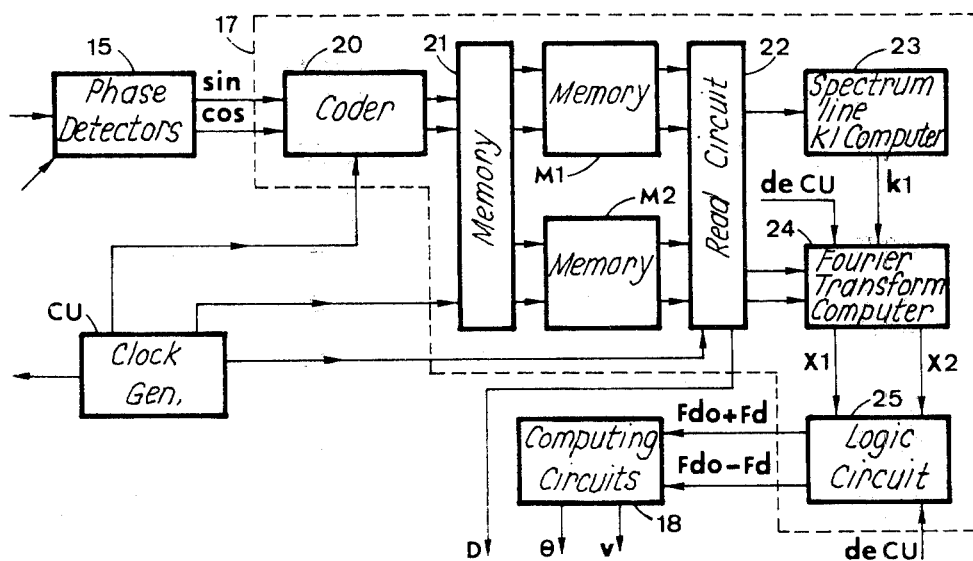
FIG. 9 is a more detailed diagram of a typical embodiment of a part of the radar shown in FIG. 8, according to the invention.

FIG. 9 gives a more detailed description of a typical embodiment of the Doppler frequency determining circuits (Doppler Processor) 17, which employs digital signal processing. The phase detecting circuit 15 supplies two signals, mutually phase shifted by ($\pi/2$) (sine and cosine signals), which enables, as is well known, the Doppler frequency sign of the target itself to be obtained. These signals are sampled and coded in coder 20 by range bins and then recorded from memory circuits 21 in one or the other of the two memories M1 and M2 used alternately for writing and reading. These recording circuits and memories are organized so that the signals of N repetition periods of antenna scanning in one direction are written respectively in N lines in one of the memories M1 or M2 with $2q$ planes ($q$ being the number of sample bits, $q$ planes being attributed to the samples of the sine signal and the $q$ others to the cosine signal), each column corresponding to a given range bin. In addition, recording takes place in one of the memories during scannings giving increasing phases of the signal received, the other memory being similarly employed for reverse direction scanning.

It will be realized that the capacity of memories M1 and M2 must be such that they contain all the signals received during measuring time $pt_o$, i.e., during $p$ antenna scanning periods. Thus, taking $p$ as an even number, which is preferably the case, each memory should comprise P/2 ×N lines. However, to give the signal processing circuits the time required to determine the Doppler frequency values, memories M1 and M2 are selected with $p \times N$ lines, which enables said frequencies to be determined for the signals recorded during a measuring period $pt_o$ in the first half of the memories, during which time the recording of the signals of the following measuring period in the second half of the memories is accomplished, and vice versa.

Such a memory arrangement per se, is realizable within the skill of the related arts, and is well known in the field of digital signal processing coherent pulse Doppler radars. In particular, it is quite similar to that described, for example, in U.S. Pat. No. 3,359,556. The reading circuits 22 of memories M1 and M2 enable two different successive operations to be carried out during each measuring period, as follows:

A. A first reading with re-recording of all the signals written during the previous period $pt_o$, this being column by column, first in memory M1 and then in memory M2; thus, for a given column, one reads in M1 half a column with P/2 × N lines corresponding to the odd scannings of the antenna array during the previous measuring period $pt_o$, and then in M2, half the column corresponding to the even scannings. The signals read (by circuits 22) are sent to a circuit 23 for determining the value $kl$ giving the order of the spectrum lines bracketing the Doppler frequency for each column and for each antenna scanning direction. This determination is made, for each scanning direction, for all the signals received from the range bin during the P/2 even (or odd) scannings corresponding to the direction in question. This determination can be made, for example, by counting the number of times the signal passes through zero (zero crossing counting) during said P/2 scannings. It is clearly unnecessary to make this determination both for sine and cosine signals. It suffices, for example, to determine it for the sine signals and thus simply read the $q$ first planes of each memory. The different values kl obtained for each range bin and for each scanning direction are retained until used as explained hereafter.

B. A second reading without re-recording of the same signals read during the first reading and in the same way; the signals read for each range bin and scanning direction are sent to a Fourier transform digital computer 24 which computes, for each signal obtained in P/2 scannings in the same direction for the range bin in question, the amplitudes X1 and X2 for the lines bracketing the Doppler frequency to be determined, this being done using previously determined value $kl$ giving the order of these lines which previously measured, and which is supplied to it by circuit 23. Such a Fourier transform computer is well known per se. It enables the Fourier transform to be computed from sample values Uc(ti) of the cosine signal and Us(ti), of the sine signal and value $kl$ in accordance with the relation:

$$X_1{}^2 = \left[\sum_{o}^{m}\left[U_c(ti)\cos 2\pi Fkl\,ti - U_s(ti)\sin 2\pi Fkl\,ti\right]\right]^2 + \left[\sum_{o}^{m}\left[U_s(ti)\cos 2\pi Fkl\,ti + U_c(ti)\sin 2\pi Fkl\,ti\right]\right]^2$$

where $m + 1$ is the number of samples of the signal analyzed and $ti$ represents the sampling moments. The same relation is used for simultaneously computing X2, replacing frequency Fkl by frequency F($kl + 1$).

Reading circuits 22, at the same time as they transmit samples of a column to computer 24, indicate the range bin order and hence provide range D.

The pairs X1-X2 are supplied to a logic circuit 25 which then provides the corresponding Doppler frequency value. This circuit can, for example, compute X1 − X2/X1 + X2 which, as can easily be demonstrated, is proportional to the deviation between the Doppler frequency to be determined and the median frequency between Fkl and F($kl + 1$), when the envelope of the spectrum ([sin $x$]/$x$) is likened to an isosceles triangle. Another more accurate method consists in providing circuit 25 with a read-only memory as a table giving the deviation between frequency Fkl (known through kl) and the real Doppler frequency and with circuits for addressing it with the normalized values $$\frac{X1}{X1 + X2}$$

and $$\frac{X2}{X1 + X2}.$$

Clock circuit CU supplies all the time signals controlling the functioning of circuits 20 to 25.

It can be seen from the above description that the target observation time (here $pt_o$) is markedly higher than with a conventional radar. But this is very considerably compensated for by the fact that all the elevations located in the zone of surveillance are examined substantially contemporaneously.

It is not intended that the scope of the invention should be limited by the drawings or this description, these being illustrative and typical only.

What is claimed is:

1. A radar for continuous high accuracy surveillance of a region of space comprising:

a linear array having a plurality of N antenna elements in a first plane;

pulse transmitting means connected to transmit pulses of radio frequency energy;

a coherent radar receiver having a phase detector output and being connected to receive target echo signals between successive pulses of said transmitting means and to provide a Doppler frequency signal;

switching means for sequentially connecting each of said antenna elements to at least one of said transmitting and receiving means, said switching means being arranged to scan said elements first in one direction and alternately in the other direction along the line of said array to produce commutation;

means responsive to said coherent receiver for determining a pair of frequency values of said Doppler signal for each target echo signal, one value in each of said pairs of values corresponding to the Doppler signal received during each of said directions of array scan;

and means responsive to said pairs of Doppler signals to compute an angular position for each target corresponding to a target echo.

2. The radar apparatus of claim 1 in which said switching means is arranged to dwell on each of said array elements for substantially a full repetition period.

3. Apparatus according to claim 1 further including means responsive to said pairs of Doppler signals to compute the velocity of each corresponding target as a function of the net Doppler effect due to target motion.

4. Apparatus according to claim 2 further including means responsive to said pairs of Doppler signals to compute the velocity of each corresponding target as a function of the net Doppler effect due to target motion.

5. The radar device according to claim 3, wherein said circuits for determining said pairs of Doppler frequency values include; a circuit for sampling and encoding said receiver output Doppler signal in a plurality of successive range bins over at least a part of each pulse repetition interval, first and second memories, each including read and write means, said first memory being read while said encoded Doppler signals are being recorded in said second memory, and vice versa, both said reading and recording being effected discretely for each of said range bins;

a digital Fourier transform computer responsive to signals read from said first and second memories thereby to produce a pair of Doppler frequency values for each of said range bins corresponding to two array scan directions;

and means responsive to said Doppler frequency values to discretely compute the velocity of the target corresponding to the signal in each of said range bins.

6. Apparatus according to claim 5 in which said Fourier transform computer is adapted to produce said Doppler frequency values from a plurality of array scan cycles in each of said scan directions.

7. Apparatus according to claim 1 in which said linear array is connected to receive only and thereby to commutate only received signals and an additional antenna is provided for transmitting only.

8. Apparatus according to claim 1 in which said linear array is connected to transmit only and thereby to commutate only transmitted signals and an additional antenna is provided for receiving only.

9. Apparatus according to claim 1 in which said array is oriented in said plane such that said commutation progresses in the plane of the directional coordinate in which angular positional measurement is to be effected.

10. Apparatus according to claim 9 in which each of said antenna elements comprises a plurality of radiator in said first plane, the line of said plurality of radiators extending normal to said plane of the directional coordinate in which said positional measurement is to be effected, thereby to provide predetermined beam shaping in a plane normal to both said first plane and said plane of the directional coordinate of positional measurement.

* * * * *